United States Patent Office 2,702,262
Patented Feb. 15, 1955

2,702,262

VITAMIN COMPOSITION

Abraham Bavley, Brooklyn, and Albert E. Timreck, New York, N. Y., assignors to Chas. Pfizer & Co., Inc., New York, N. Y., a corporation of Delaware No Drawing. Application April 28, 1952,
Serial No. 284,825

6 Claims. (Cl. 167—81)

This invention is concerned with improved vitamin compositions and methods of preparing these. In particular, it is concerned with highly stable preparations of oil-soluble vitamins, particularly useful for incorporation in many pharmaceutical products.

It has been found that fat- or oil-soluble vitamins, vitamin A, vitamin D, vitamin E or mixtures of two or more of these, may be prepared as a solid solution in certain hydrogenated oils or waxes, and the resulting solution may be dispersed as very fine globules within a plasticized, gelled colloid matrix. Such novel products are prepared by dissolving the fat-soluble vitamin in a molten hydrogenated oil, dispersing the resulting solution throughout an aqueous solution of a water-soluble gelable colloid and a suitable plasticizer for the colloid. The molten oil-vitamin solution is preferably added to the aqueous solution while the temperature is kept at least at or above the melting point of the waxy constituent. The mass is stirred so that the oily phase is incorporated in finely dispersed form throughout the aqueous solution of colloid and plasticizer. Dispersion may be assisted by rapid stirring or by homogenization in suitable conventional equipment. The gelable mixture may then be formed into sheets or into globular particles by methods such as are described in U. S. Patents Nos. 2,183,053, 2,183,084, 2,218,592, and 2,643,209, and in the copending patent applications Serial Nos. 247,198 (filed on September 18, 1951, by Abraham Bavley et al.), and 261,144 (filed on December 11, 1951, by Abraham Bavley et al.).

As noted above, various oil-soluble vitamins may be used in preparing compositions of this invention. These include esters of vitamin A like the acetate, vitamin A oleate, vitamin A palmitate and so forth. Many biologically active forms of vitamin D, such as vitamin D₂ or vitamin D₃, may also be used. Different forms of vitamin E, for instance α·β·γ tocopherols, are suitable. The vitamins may be used in pure form or as crude materials, such as occur in various natural sources. However, we find high potency vitamin A compounds, such as crystalline vitamin A acetate, are particularly useful in the preparation of the compositions of this invention.

Many hydrogenated oils or fats, usually glycerides of saturated long-chain fatty acids, may be used for preparing the compositions of this invention. In general, these materials should have a melting point of at least about 40° C. and preferably from about 40° to about 80° C., and they should be sufficiently saturated to have a wax-like consistency. A variety of hydrogenated oils, waxes and the like are available which meet these requisites. For instance, certain forms of hydrogenated cotton seed oil, hydrogenated peanut oil, hydrogenated soybean oil and numerous other edible vegetable oils are especially valuable in vitamin preparations. The useful hydrogenated oils are normally solid, i. e. at room temperatures. Best results are usually realized when they have melting points substantially between 55° and 70° C.

Various colloidal materials, both natural and synthetic, which are water-soluble may be employed for the preparation of the compositions of this invention. They, of course, should be non-toxic in nature for human and animal consumption. Of particular utility is gelatin which is readily obtainable. Other comparable gelable colloids like agar, pectin and so forth may be used. Mixtures of these materials with gelatin are particularly successful. Furthermore, synthetic polymeric, partially water-soluble materials, such as polyvinyl alcohol and polyvinylpyrrolidone, can be utilized as part of the gelable matrix.

Compositions of this nature are described in the aforesaid copending patent application Serial No. 247,198. Generally sufficient gelled matrix is prepared to allow say from 10 to 30 percent by weight of the vitamin-oil solution dispersed therein. This, of course, may be varied depending upon the potency desired in the finished, dry product.

The colloids are plasticized by sugar-like materials which are soluble in water and which impart to the gelled compositions great stability against mechanical destruction. If such plasticizing agents are not used, the subdivided particles of product are considerably more fragile and also are more susceptible to the deleterious action of air. In addition to corn syrup, which is particularly useful, glucose, glycerol, mannitol, sorbitol, sucrose, dextrins, and other comparable materials are operable as plasticizers.

Compositions of particularly high activity may be prepared using the process of this invention and, furthermore, these materials retain a very high proportion of their activity over a considerable length of time, even though the material may be stored at a rather elevated temperature. If crystalline vitamin A acetate is used as a source of the biologically active material, compositions containing a potency of as high as 500,000 units of vitamin A per gram of finished, dried product may be obtained. Using purified forms of the other vitamins, comparable potencies may be obtained. We have found that when products are prepared according to this invention, the vitamins incorporated in the dried product are particularly highly available to animals and to man; that is, a very high proportion of the biological activity is put to good use. Comparisons have been made between the products of the present invention and various commercially-available vitamin materials, such as vitamin A or vitamins A and D in conventional oils or aqueous emulsions. It has been found that the new materials are much more readily assimilable in the body than heretofore commercially available forms. This is exhibited inter alia by the results of liver storage tests and growth rates of various animals.

In general, we prefer to use a proportion by weight of vitamin to hydrogenated oil of not greater than one in our compositions; that is, the waxy phase should have a concentration of the vitamin not greater than 50% in order to obtain the most favorable results. The vitamin may, of course, be vitamin A acetate, vitamin A palmitate, purified fish oils, and other materials of this nature, such as forms of vitamin D and E. Furthermore, an edible oil-vitamin A product, such as is described in the copending patent application Serial No. 269,578, filed on February 1, 1952, by William E. Stieg et al., may be incorporated in the waxy vehicles of this invention. In general, a proportion of hydrogenated oil to vitamin need not be greater than about 5 to get the maximum beneficial effects of our compositions. The components of the gel phase of our compositions can also be varied in proportion. The weight ratio of gelable colloid, e. g. gelatin, to sugar, e. g. corn syrup, may be varied in the range of about 0.5 to about 1.0. The upper part of this range gives more favorable results. Sufficient water must be used in preparing the compositions so that the mixture is stirred with a fair degree of ease and so that the wax phase may be well dispersed throughout the aqueous phase.

In preparing the compositions of this invention, the various ingredients may be mixed and heated in an aqueous medium to obtain a product of uniform dispersion. In general, it is preferred to dissolve the gelable colloidal material in water, together with the sugar-like plasticizer. When a clear solution of these materials has been obtained, the warm solution of vitamin in hydrogenated oil is added. When the vitamin is introduced, it may be advisable to blanket the mixture with an inert atmosphere, such as nitrogen or carbon dioxide. The mixture is then vigorously agitated while a temperature of at least about 45° C. is maintained so that the oily phase may be dispersed as finely divided globules throughout the aqueous phase. If the oil-vitamin phase is added to the aqueous phase at a temperature lower than the melting point of the former, there is a tendency to form hardened granules of the oil phase which are not properly dispersed throughout the gelable mass. As pointed out above, the dispersion of the vitamin-oil phase may be materially assisted by homogenization of the hot mixture. In general, it is preferred to reduce the size of the globules to 10 microns or less in diameter, and globules having an average diameter of one to five microns are particularly good. For this purpose there may be used a homogenizer such as is used in the dairy industry, that is, one in which a piston operating in a cylinder forces the mixture through a fine orifice with a great drop in pressure. Apparatus of this type is described in Perry's Chemical Engineering Handbook, third edition, p. 1167. The mixture is then chilled, either in the form of sheets or as globules. The latter may be formed by introducing the mixture into a cold, inert oil, such as corn oil or mineral oil, with agitation by a method similar to that described in U. S. patents listed above.

If a sheet of the vitamin-oil containing gelled composition is to be formed, this may be accomplished by pouring a stream of the hot mixture on an endless belt or on suitable glass or metal trays and chilling the sheets. The gelled composition may then be cut into smaller pieces and dried in air or by gently heating. A current of air may be forced over the surface of the particles to accelerate drying. The fragments may be further reduced in size by suitable grinding equipment. A method that we have found particularly valuable is described and claimed in the aforesaid copending patent application Serial No. 261,144 filed on December 11, 1951, by Abraham Bavley et al. However, we have found that using the present procedure no measurable amount of the vitamin is left on the surface of the granules in a form which is readily decomposed by the atmosphere. This eliminates the requirement for washing the material with a solvent and, thus, prevents the loss of a certain amount of material due to such washing. The ground particles of the vitamin compositions have excellent mechanical properties. They are free-flowing and form no agglomerations on standing. Grinding results in uniform size particles which are excellent for incorporation into a variety of different food and pharmaceutical products. Furthermore, the materials have a highly desirable light color which is retained even upon exposure for long periods to the atmosphere.

The products of this invention have been found particularly stable even when exposed to air at relatively high temperatures for prolonged periods of time. They are particularly suitable for incorporation into dried vitamin mixtures and in the preparation of tablets containing various vitamins. These compositions are relatively impervious to air, which is ordinarily very destructive to the oil-soluble vitamins A, D and E.

The following examples are given by way of illustration and are not to be considered as the only manner in which this invention may be embodied. It is to be understood that the protection hereof is only to be limited by the specific wording of the appended claims.

Example I

Hydrogenated cotton seed oil, having a melting point of approximately 55° C. and weighing 78 grams, was heated to about 60° C. Seventy-five grams of crystalline vitamin A acetate was then dissolved in the melted material. The solution was added rapidly to a vigorously stirred solution of 256 grams of corn syrup and 320 grams of gelatin in 650 milliliters of water at 65° C. The mixture was subjected to emulsification by means of a conventional dairy-type homogenizer. The hot emulsion was then poured in thin layers on stainless steel trays. After one hour at room temperature the sheets were stripped from the trays to permit more complete drying. After 24 hours at room temperature, the sheets were cut into chips and allowed to dry for another three days. (A stream of air may be passed over the product to speed drying.) The chips were mixed with one-third weight of finely divided Dry Ice and the mixture was passed through a standard hammer mill, which had been precooled by Dry Ice. The ground material was then dried under vacuum at 24–48° C. until the moisture content had reached about 3–4%. The product was screened and the portion having a mesh size of 50 to 120 (American Screen standard) was heated in an open dish at 80° C. for 42 hours. It was found to retain 95% of the vitamin A activity. This clearly indicates the high order of stability of the new product.

In contrast to this, when a hydrogenated cotton seed oil having a melting point of only 20° C. was employed in a similar treatment and test, only 88% of the vitamin activity was retained.

Example II

One hundred and ninety-seven grams of a vitamin A acetate-corn oil transesterified product, assaying 950,000 units of vitamin A per gram and stabilized with butylated hydroxy anisole were mixed at 65° C. with 200 grams of hydrogenated peanut oil having a melting point of about 60° C. This solution was added to a solution containing 300 grams of corn syrup, 372 grams of gelatin and 800 grams of water at 65° C. Mixing was accomplished by rapid stirring at 65° C. The mixture was homogenized, cast on stainless steel trays and dried and ground just as in Example I. The product assayed 250,000 units of vitamin A per gram and displayed particularly good stability.

Example III

A mixture of 90 grams of crystalline vitamin A acetate-corn oil transesterification product (950,000 units/g.) and 180 grams of hydrogenated soybean oil (melting point 70° C.) were melted together at 75° C. The solution was then added to a mixture of 224 grams of corn syrup, 280 grams of gelatin and 760 milliliters of water at 75° C. The mixture was homogenized and a finely divided dry product was prepared just as in Example I above. This material assayed approximately one hundred thousand units of vitamin A per gram and was particularly useful and stable for incorporation in high potency vitamin products such as tablets for oral ingestion.

Example IV

A mixture of 133 grams of vitamin A palmitate having a potency of 178,000,000 units per gram and 178 grams of hydrogenated corn oil (melting point 65° C.) was melted together at 65° C. The hot mixture was then added to a solution of 238 grams of corn syrup, 243 grams of gelatin and 760 milliliters of water at 65° C. A dry, granular product was prepared just as described in Example I above. This product had a stability of greater than 90% when heated in an open dish at 80° C. for 42 hours.

Example V

A mixture of 77 grams of crystalline vitamin A acetate, 0.55 gram of crystalline vitamin D3, 78 grams of hydrogenated peanut oil (melting point 60° C.) and 1.0 gram of butylated hydroxy anisole was stirred together at 60–65° C. The clear oily phase was then added to a solution of 256 grams of corn syrup and 320 grams of gelatin in 800 milliliters of water at 60–65° C. A dry, granular product was prepared from this mixture just as described in Example I above. The dry product is an excellent source of vitamins A and D for various pharmaceutical and food products. It displayed a stability of greater than 90% when heated in an open dish at 80° C. for 42 hours.

Example VI

A mixture of 69 grams of crystalline vitamin A acetate and 128 grams of hydrogenated peanut oil (melting point 60° C.) were melted together at 60–65° C. The clear oily phase was added to a solution of 102 grams of potato dextrin, 320 grams of gelatin and 650 milliliters of water at 65° C. Throughout the addition agitation was maintained and the mixture was then homogenized. A dry, granular product was prepared just as described in Example I above. This proved an excellent source of vitamin A for various pharmaceutical and food products.

What is claimed is:

1. A highly stable vitamin composition which comprises a gelled matrix of gelable colloid selected from the group consisting of gelatin, agar, pectin and mixtures of these, with a sugar plasticizing material, said matrix containing in dispersion finely divided particles of a solid solution of a fat-soluble vitamin selected from the group consisting of vitamins A, D and E, in hydrogenated oil which has a melting point of at least about 40° C.

2. A highly stable vitamin composition which comprises a gelled matrix of gelatin containing in dispersion finely divided particles of a solid solution of vitamin A in hydrogenated vegetable oil which has a melting point of substantially between 40° and 80° C.

3. A highly stable vitamin composition which comprises a gelled matrix of gelatin containing in dispersion finely divided particles of a solid solution of a vitamin A ester in hydrogenated vegetable oil which has a melting point of substantially between 40° and 80° C.

4. A highly stable vitamin composition which comprises a gelled matrix of gelatin containing in dispersion finely divided particles of a solid solution of vitamin A acetate in hydrogenated vegetable oil which has a melting point of substantially between 40° and 80° C.

5. A highly stable vitamin composition which comprises a gelled matrix of gelatin containing in dispersion finely divided particles of a solid solution of vitamin A palmitate in hydrogenated vegetable oil which has a melting point of substantially between 40° and 80° C.

6. A highly stable vitamin composition which comprises a gelled matrix of gelatin containing in dispersion finely divided particles of a solid solution of vitamin A acetate-corn oil transesterification product in hydrogenated vegetable oil which has a melting point of substantially between 40° and 80° C.

References Cited in the file of this patent

UNITED STATES PATENTS

| | | |
|---|---|---|
| 2,206,113 | Nitardy | July 2, 1940 |
| 2,218,592 | Taylor | Oct. 22, 1940 |
| 2,410,110 | Taylor | Oct. 29, 1946 |

OTHER REFERENCES

Sandell, Quarterly Journal of Pharmacy and Pharmacology, Jan.–Mar. 1947 (Abstracts), p. 68.